UNITED STATES PATENT OFFICE.

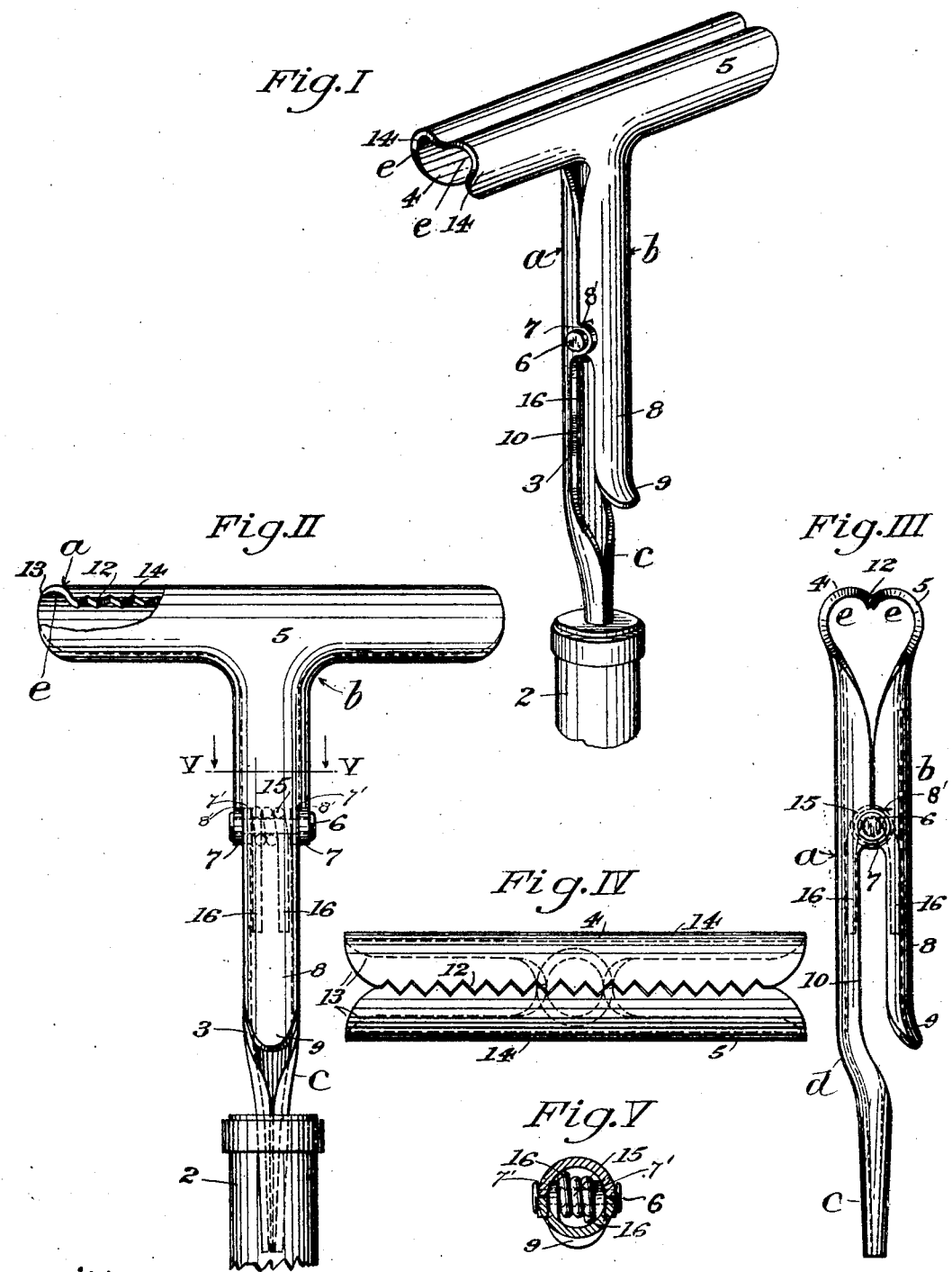

EDGAR O. LOEBER, OF LOS ANGELES, CALIFORNIA.

MOP-HEAD.

No. 803,769.          Specification of Letters Patent.          Patented Nov. 7, 1905.

Application filed February 17, 1903. Serial No. 143,788.

*To all whom it may concern:*

Be it known that I, EDGAR O. LOEBER, a citizen of the United States of America, residing in the city of Los Angeles, in the county of Los Angeles, State of California, have invented certain Improvements in Mop-Heads, of which the following is a specification.

This invention relates to improvements in mop-heads, and has for its object the provision of a simple, cheap, and durable mop-head in which the jaws shall be normally positively gripped together and so constructed as to avoid all sharp points which might scratch or injure the floor or any portion of the woodwork or any articles of furniture with which it might come in contact.

Another object of this invention is to produce a mop-head of minimum weight and maximum strength and superior convenience of use.

With this end in view the mop-head consists of two T-shaped semitubular members formed of sheet metal, one of said members constituting the stationary shank and the stems of said members being pivoted together intermediate the ends of said stems.

The accompanying drawings illustrate the invention, and referring to the same—

Figure I is a perspective view of a mop-head embodying my invention, a fragment of the handle being shown. Fig. II is a front elevation thereof. Fig. III is a side elevation. Fig. IV is a plan view. Fig. V is a sectional plan view taken from the line V V of Fig. II.

As shown in the drawings, *a* in a general way indicates the semitubular T-shaped stationary member of the mop-head, and *b* in like manner designates the semitubular T-shaped movable member pivoted thereto.

2 indicates a mop-handle, which may be of the ordinary or any preferred construction.

3 indicates the shank of the stationary jaw 4 of the mop-head. This shank 3 may be secured in the handle 2 in the ordinary or any preferred manner.

5 represents the movable jaw, the shank of which is pivoted on the stationary member *a* by a pivot-pin 6, which passes through the ears or lugs 7 in the shank 3 and through holes in similar ears or lugs 7' on the edges of the shank of the movable jaw. This pin is preferably riveted in place, as shown. In front of the ears 7' each edge of the shank of the jaw *b* is slitted transversely a short distance, as shown at 8' in Fig. III, which will permit of the ears 7' being bent in the thickness of the metal, and thereby fit between the ears 7, as shown in dotted lines in Fig. II and in full lines in Fig. V. This permits of the portion of the holder forward of the pivot being made circular in cross-section, as shown in Fig. V, with the opposing edges of the two jaws almost in actual contact, while to the rear of the pivot the edges of the jaws are cut away to give plenty of room for them to approach each other, which causes that portion of the holder to be of a less width in the line of the pivot than in front of the pivot, as shown in Fig. II. In this manner external shoulders or corners in front of the pivot are avoided and the shoulders 8' virtually rest on or bear against the ears 7, and thereby assist in preventing lateral movement of the jaw 5 relatively to the jaw 4, even though the pivot should fit loosely in the perforations of the ears.

The shank 3 of the jaw 4 is preferably concave or semicylindrical in cross-section from a point near the handle end, and the arm 8 of the jaw 5 has an upturned end 9, a portion of the shank 3 being cut away at 10, permitting the arm 8 to move sufficiently to secure the required opening of the jaws.

The jaws 4 and 5 are rounded or hook-shaped in cross-section, as at 14, so as to curve downwardly and inwardly toward each other, as best shown in Fig. III, and are provided on their edges with serrations 12, which form teeth, the serrations of the respective jaws being so arranged as to intermesh when the jaws are closed. Besides causing the sharp teeth to stand below or to the rear of the forward portion of each of the jaws, and thereby be shielded and prevented from damaging anything with which they should happen to come in contact, the teeth of one of the jaws will cross the teeth of the other jaw at an angle, and thereby cause them to engage more securely with the mop-cloth than if they normally stood in the same plane, for in the latter instance the opening of the jaws to receive the cloth would cause the teeth to move outward, and thereby stand at more or less of an obtuse angle to each other, which would lessen their holding power to that extent. The jaws being hook-shaped, as described, hold the mop-rag more firmly against an outward pull than they would if they did not curve downwardly and inwardly toward each other.

In addition to the longitudinal curvature of the jaws, as at 14, each end of each jaw is curved, thereby forming a head which can be moved against walls or furniture without the danger of scratching them, as would be the case with angular jaws.

15 represents a spring having its coil interposed about the pivot-pin 7 and having its ends 16 bearing, respectively, against the shank 3 of the stationary jaw 4 and the oppositely-disposed shank 8 of the movable jaw 5. Since the ends of said spring bear against and are housed within concave surfaces, it is thereby safely guarded against accidental displacement. This spring normally holds the jaws together and when in use causes the pivoted jaw to bear tightly against the mop-rag inserted between the jaws, the serrations or teeth 12 firmly gripping the mop-rag.

$c$ is the stock portion of the member $a$, which is formed by bending the lower end of the stem of said member into a tapering tubular form, as clearly shown in Fig. III. The shank member $a$ is curved, as at $d$, to bring the stock portion $c$ axially in line with the cylindrical body formed by the pivoted stems of the members $a$ and $b$. Such bent portion forms a recess into which the free end of the stem of the member $b$ can enter for the purpose of opening the jaws to receive the mop-cloth. (Not shown.)

By the semitubular form of both the heads and stems of the T-shaped members great rigidity and strength is assured at very little expense of material and but slight weight. Furthermore, the mop-head is thus given a round form over which the mop-cloth can be more or less wound, as may be found desirable, and, moreover, a hook shape is thus given the mop-cloth-holding jaw, portions of the head which receive the mop-cloth thus not depending simply upon the teeth or serrations of the head to hold the mop-cloth, but providing cavities $e$ forwardly of the teeth into which the double portion of the mop-cloth (not shown) may extend when the teeth are closed upon the mop-cloth.

Having thus described my invention, I claim as new and desire to secure by Letters Patent—

In a mop-head, two substantially T-shaped members pivotally secured together, each of which is semitubular in cross-section to form a shank and a jaw, each jaw being provided with teeth and each shank with perforated ears, the edge of one of the shanks being slitted in front of its ears to form shoulders to bear against the ears of the other member, the ears to the rear of said slits being bent inward to fit between the ears of the other member, a pivot through said perforations, and a coil-spring around said pivot with its ends in engagement with the respective shanks of the two members.

In testimony whereof I have hereunto set my hand, this 12th day of February, A. D. 1903, in Los Angeles, in the county of Los Angeles, State of California.

EDGAR O. LOEBER.

In presence of—
 FREDERICK S. LYON,
 JULIA TOWNSEND.